J. W. ROPP.
Toe-Weights for Horses.

No. 208,927.  Patented Oct. 15, 1878.

Witnesses  Inventor

UNITED STATES PATENT OFFICE.

JEROME W. ROPP, OF ELYRIA, OHIO.

IMPROVEMENT IN TOE-WEIGHTS FOR HORSES.

Specification forming part of Letters Patent No. 208,927, dated October 15, 1878; application filed August 30, 1878.

*To all whom it may concern:*

Be it known that I, JEROME W. ROPP, of Elyria, in the county of Lorain and State of Ohio, have invented a certain new and Improved Box Toe-Weight for Horses; and I do hereby declare that the following is a full, clear, and complete description thereof, reference being had to the accompanying drawings, making a part of the same.

Figure 1:
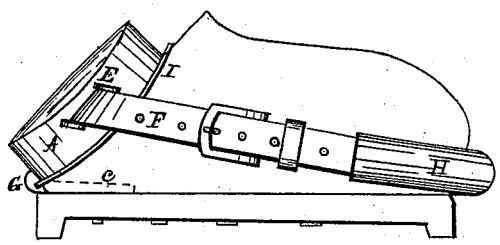
Figure 2:
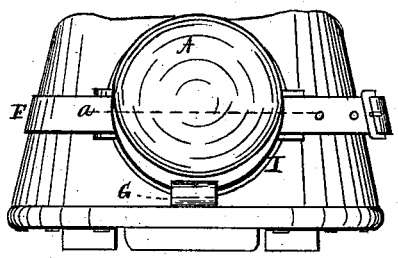
Figure 3:
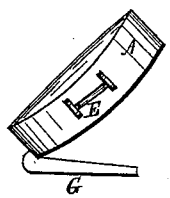
Figure 4:
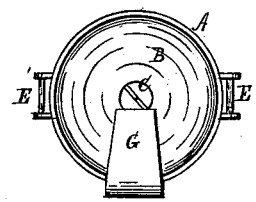
Figure 5:
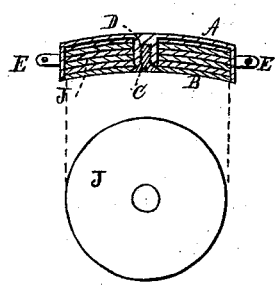

Figure 1 is a side view of a hoof having attached thereto the toe-weight alluded to. Fig. 2 is a front view of the same. Figs. 3 and 4 are views of the weight detached from the hoof. Fig. 5 is a transverse section.

Like letters of reference refer to like parts in the several views.

The nature of this invention relates to a weight to be applied to horses' feet to prevent overreaching of the hind with the front feet, and to cause the horse to throw or reach forward his front feet, thereby improving the speed of the animal, and also by means of the said weights to change the gait of a pacing-horse to a trot.

Said weight consists of a box or shell provided with a tongue or spur, whereby to secure it to the feet of the animal by inserting said tongue between the hoof and the shoe. The box is also provided with a pair of loops, to which a strap is made fast for binding the weight to the hoof.

I am aware that toe-weights have been used for the purpose above stated, and that they have been secured to the hoof by straps, &c., and that toe-weights have been used susceptible of being made heavier or lighter by adding to or taking from such weight certain parts, as the case may be; but that which distinguishes my toe-weight from others, and is the special novelty of the invention, is the peculiar manner of increasing or diminishing the burden of the toe-weight, as the nature of the case may require, by placing in the aforesaid box one or more plates of metal, or removing such plates therefrom, as may from time to time be required.

A more particular description of the invention is as follows:

In the drawings, A represents the box or case above referred to. Said box is of a circular form or other suitable shape, having the upper side slightly curved in direction of the dotted line *a*, Fig. 2. The under side of the box is also curved to adapt it to the curvature of the hoof. Access is had to the inside of the box from the under side, which is fitted with a cover, B, as shown in the transverse section, Fig. 5.

The cover is secured in place by a screw, C, extending through it into a stud, D, projecting from the inside top of the box of which it forms a part. On two opposite sides of the box are loops E, to which is made fast the strap F, for binding the weight to the foot.

G is a tongue or stem secured to the box, and having such relation thereto as shown in Fig. 3.

The application of the above-described weight to the horse's foot will be readily understood on examination of Figs. 1 and 2, in which it will be seen that the tongue G is inserted under the toe of the hoof, as indicated by the dotted line *c*, a groove being cut in the hoof for its admission between the hoof and the shoe. Said tongue prevents a lateral displacement of the weight while it is bound tightly to the hoof by the strap F, one end of which is made fast to one of the loops E, from which it passes around the hoof to the opposite side of the weight, and is buckled to the ear on that side, as shown in Figs. 1 and 2. To prevent the strap from galling and wounding the back part of the hoof, it is passed through a rubber tube, H, which by its elasticity and softness, serves as a pad for the purpose specified.

It will be observed that between the weight and the hoof is placed a pad or packing, I, to prevent the metal box from abrading the hoof, and also to cause it to fit closely thereto.

To give the required weight to the box, there is placed therein (before it is secured to the foot) one or more metal plates, J, Fig. 5. If one of the plates is sufficient for the purpose, the rest of the space in the box may be filled with some light material—as felt, cork, &c.—to keep the weight in place, and to prevent rattling. In the event a heavier weight is needed, additional plates are placed in the box, and for a very heavy weight the box may be filled with a series of plates, as shown in Fig. 5; hence it will be obvious that by the use of such plates the box-weight may be graduated and applied to an animal requiring either a heavy or light toe-weight, thereby avoiding the expense of several sets of different weights for several animals, or for the same animal, as the necessity of the condition of the horse may require during the time it may be obliged to wear the weight for curing the fault of overreaching, for improving the speed, and for changing the gait of the horse, as before mentioned.

In toe-weights made to be secured to the hoof by screws or nails, which have to be removed that the weight may be taken off to be replaced by a heavier or lighter one, it is a matter of some trouble to remove the weight, as the screws or nails may have rusted in the hoof or shoe, and must therefore be broken off, and the nails must be torn out should the weight be fastened by them. In this way the hoof is sometimes torn and seriously injured, but such injury is avoided by using the box toe-weight herein described, as it is not nailed or screwed to the hoof or shoe, but secured thereto by the tongue G and strap, which can be easily and readily removed from the foot, and as easily attached thereto.

What I claim as my invention, and desire to secure by Letters Patent, is—

In toe-weights for horses, the box A, provided with a cover and one or more movable plates for increasing or diminishing said weight, and having suitable means for attaching said box to the foot, substantially as and for the purpose set forth.

JEROME W. ROPP.

Witnesses:
W. H. BURRIDGE,
JOHN H. BURRIDGE.